United States Patent
Kaltenbach et al.

(10) Patent No.: US 10,493,839 B2
(45) Date of Patent: Dec. 3, 2019

(54) DRIVE ARRANGEMENT FOR A HYBRID VEHICLE AND DRIVE TRAIN COMPRISING SUCH A DRIVE ARRANGEMENT

(71) Applicant: ZF Friedrichshafen AG, Friedrichshafen (DE)

(72) Inventors: Johannes Kaltenbach, Friedrichshafen (DE); Johannes Glückler, Eriskrich (DE); Stefan Renner, Bodman-Ludwigshafen (DE); Rayk Gersten, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 21 days.

(21) Appl. No.: 15/773,002

(22) PCT Filed: Oct. 12, 2016

(86) PCT No.: PCT/EP2016/074446
§ 371 (c)(1),
(2) Date: May 2, 2018

(87) PCT Pub. No.: WO2017/076592
PCT Pub. Date: May 11, 2017

(65) Prior Publication Data
US 2018/0319266 A1  Nov. 8, 2018

(30) Foreign Application Priority Data
Nov. 3, 2015 (DE) .......... 10 2015 221 499

(51) Int. Cl.
*B60K 6/365* (2007.10)
*B60K 6/387* (2007.10)
(Continued)

(52) U.S. Cl.
CPC .............. *B60K 6/365* (2013.01); *B60K 6/387* (2013.01); *B60K 6/40* (2013.01); *B60K 6/48* (2013.01);
(Continued)

(58) Field of Classification Search
CPC .......... B60K 6/365; B60K 6/387; B60K 6/48; B60K 6/40; B60K 6/547; B60K 2006/381;
(Continued)

(56) References Cited

U.S. PATENT DOCUMENTS 7,992,458 B2  8/2011  Krieger et al.
8,663,065 B2  3/2014  Kaltenbach
(Continued)

FOREIGN PATENT DOCUMENTS

DE  10 2005 043 703 A1  3/2007
DE  10 2009 046 620 A1  5/2011
(Continued)

OTHER PUBLICATIONS

German Search Report Corresponding to 10 2015 221 487.7 dated Sep. 22, 2016, (9 pages).
(Continued)

*Primary Examiner* — Mark J Beauchaine
(74) *Attorney, Agent, or Firm* — Davis & Bujold PLLC; Michael J. Bujold (57) ABSTRACT

A hybrid drive arrangement including combustion engine (7), an electric machine (6) and a transmission with input shafts (4, 5) and an output shaft. The drive arrangement has a planetary gearset (PG) with a first element that can be rotationally engaged with shaft (4), and a second element that can be fixed to the housing or machine (6). Shift element (K) couples a third element of gearset (PG) to the housing or to rotationally engage with machine (6). Shift element (J)
(Continued)

couples the third element of gearset (PG) with engine (7). Shift elements (C, D) respectively couple the shafts (4, 5) with engine (7) and form a double shift element (S1), whose actuator (10) extends through a section (11) of a drive shaft (12) of the engine (7), which encompasses, on the outside, shift element (S1). Section (11) of shaft (12) of engine (7) extends to shift element (J).

13 Claims, 5 Drawing Sheets

(51) Int. Cl.
| | |
|---|---|
| *B60K 6/40* | (2007.10) |
| *B60K 6/48* | (2007.10) |
| *B60K 6/547* | (2007.10) |
| *F16H 3/00* | (2006.01) |
| *F16H 3/095* | (2006.01) |
| *F16H 3/097* | (2006.01) |
| *F16H 3/72* | (2006.01) |
| *F16H 37/04* | (2006.01) |
| *B60K 6/38* | (2007.10) |
| *F16H 3/093* | (2006.01) |

(52) U.S. Cl.
CPC .............. *B60K 6/547* (2013.01); *F16H 3/006* (2013.01); *F16H 3/095* (2013.01); *F16H 3/097* (2013.01); *F16H 3/725* (2013.01); *F16H 37/046* (2013.01); *B60K 2006/381* (2013.01); *B60K 2006/4816* (2013.01); *F16H 2003/0931* (2013.01); *Y02T 10/6221* (2013.01); *Y02T 10/6256* (2013.01)

(58) Field of Classification Search
CPC .......... F16H 3/006; F16H 3/095; F16H 3/097; F16H 3/725; F16H 37/046
See application file for complete search history.

(56) References Cited

U.S. PATENT DOCUMENTS

| | | | |
|---|---|---|---|
| 8,684,875 B2 | 4/2014 | Kaltenbach et al. | |
| 8,911,315 B2 | 12/2014 | Kaltenbach et al. | |
| 8,961,345 B2 | 2/2015 | Kaltenbach et al. | |
| 9,180,872 B2 | 11/2015 | Lee et al. | |
| 9,403,428 B2 | 8/2016 | Glueckler | |
| 9,528,583 B2 | 12/2016 | Lübke et al. | |
| 9,541,180 B2 | 1/2017 | Kaltenbach | |
| 9,546,721 B2 | 1/2017 | Mittelberger et al. | |
| 2005/0137042 A1* | 6/2005 | Schmidt ............... | B60K 6/387 475/5 |
| 2012/0216639 A1 | 8/2012 | Renner | |
| 2012/0240723 A1 | 9/2012 | Gluckler et al. | |
| 2013/0096761 A1 | 4/2013 | Kuroda et al. | |
| 2014/0038762 A1 | 2/2014 | Wechs | |
| 2014/0150604 A1 | 6/2014 | Kaltenbach | |
| 2015/0184731 A1 | 7/2015 | Lee et al. | |
| 2015/0226324 A1 | 8/2015 | Gluckler et al. | |
| 2015/0267778 A1 | 9/2015 | Peterson et al. | |
| 2015/0375736 A1 | 12/2015 | Kaltenbach et al. | |

FOREIGN PATENT DOCUMENTS

| | | |
|---|---|---|
| DE | 10 2009 054 752 A1 | 6/2011 |
| DE | 10 2010 030 571 A1 | 12/2011 |
| DE | 10 2010 030 573 A1 | 12/2011 |
| DE | 10 2010 030 575 A1 | 12/2011 |
| DE | 10 2010 063 582 A1 | 6/2012 |
| DE | 10 2011 005 531 A1 | 9/2012 |
| DE | 10 2011 080 069 A1 | 1/2013 |
| DE | 10 2013 105 785 A1 | 12/2013 |
| DE | 10 2012 213 711 A1 | 2/2014 |
| DE | 10 2012 217 503 A1 | 3/2014 |
| DE | 10 2012 218 367 A1 | 4/2014 |
| DE | 10 2012 220 063 A1 | 5/2014 |
| DE | 10 2012 220 829 A1 | 5/2014 |
| DE | 10 2012 221 889 A1 | 6/2014 |
| DE | 10 2013 200 158 A1 | 7/2014 |
| DE | 10 2013 211 969 A1 | 1/2015 |
| DE | 10 2013 222 510 A1 | 5/2015 |
| DE | 10 2014 202 381 A1 | 8/2015 |
| EP | 2 457 760 A2 | 5/2012 |
| WO | 2012/084330 A1 | 6/2012 |
| WO | 2015/142265 A1 | 9/2015 |

OTHER PUBLICATIONS

German Search Report Corresponding to 10 2015 221 490.7 dated Sep. 23, 2016, (9 pages).
German Search Report Corresponding to 10 2015 221 499.0 dated Jul. 15, 2016, (8 pages).
German Search Report Corresponding to 10 2015 221 514.8 dated Sep. 29, 2016, (9 pages).
German Search Report Corresponding to 10 2015 221 493.1 dated Sep. 27, 2016, (9 pages).
International Search Report Corresponding to PCT/EP2016/074680 dated Jan. 26, 2017, (7 pages).
International Search Report Corresponding to PCT/EP2016/073763 dated Dec. 7, 2016, (7 pages).
International Search Report Corresponding to PCT/EP2016/074446 dated Dec. 13, 2016, (6 pages).
International Search Report Corresponding to PCT/EP2016/076417 dated Feb. 17, 2017, (9 pages).
International Search Report Corresponding to PCT/EP2016/074687 dated Jan. 2, 2017, (7 pages).
Written Opinion Corresponding to PCT/EP2016/074680 dated Jan. 26, 2017, (7 pages).
Written Opinion Corresponding to PCT/EP2016/073763 dated Dec. 7, 2016, (8 pages).
Written Opinion Corresponding to PCT/EP2016/074446 dated Dec. 13, 2016, (7 pages).
Written Opinion Corresponding to PCT/EP2016/076417 dated Feb. 17, 2017, (8 pages).
Written Opinion Corresponding to PCT/EP2016/074687 dated Jan. 2, 2017, (5 pages).

* cited by examiner

| Shift Matrix | S2 | | S3 | | S1 | | S4 | | | S5 | | S6 | | i | phi |
| --- | --- | --- | --- | --- | --- | --- | --- | --- | --- | --- | --- | --- | --- | --- | --- |
| | J | K | A | B | C | D | E | F | G | H | I | L | S | | |
| 1 (2) | x | x | x | | x | | | x | | x | | x | | 10.593 | 1.300 |
| 2 (1) | x | x | x | x | | x | | x | | x | | x | | 8.150 | 1.300 |
| 2 (4) | x | x | | x | x | x | | x | | x | | x | | 8.150 | 1.300 |
| 3 (4) | x | x | | x | | x | x | | | x | | x | | 6.270 | 1.299 |
| 4 (3) | x | x | | x | x | x | x | | | x | | x | | 4.826 | |
| 4 (5) | x | x | | x | | x | | | x | x | x | x | | 4.826 | 1.301 |
| 5 (4) | x | x | x | x | | | | | x | | x | x | | 3.711 | |
| 5 (9) | x | x | x | | x | x | | | x | | x | x | | 3.711 | |
| 5 (6) | x | x | x | | | x | | | x | | x | x | | 3.711 | |
| 6 (7) | x | x | | x | | x | | x | | | x | | | 2.856 | 1.300 |
| 7 (6) | x | x | | x | | x | | x | x | | x | | | 2.197 | |
| 7 (9) | x | x | | x | | x | | x | x | | x | x | x | 2.197 | 1.300 |
| 8 (9) | x | x | | x | x | | x | | x | | x | x | x | 1.689 | 1.299 |
| 9 (8) | x | x | | x | x | | x | | x | | | x | x | 1.301 | |
| 9 (10) | x | x | | x | | | x | | x | | | x | x | 1.301 | 1.301 |
| 10 (9) | x | x | | x | x | x | | | x | | | x | x | 1.000 | |
| 10 (11) | x | x | | x | x | | x | | x | | | x | x | 1.000 | 1.299 |
| 11 (10) | x | x | | x | x | | x | | x | | | x | x | 0.770 | 1.300 |
| 12 (10) | x | x | | x | x | | | x | x | | | x | x | 0.592 | |

Fig. 5

| Shift Matrix | S2 | | S3 | | S1 | | S4 | | | S5 | | S6 | | i | phi |
|---|---|---|---|---|---|---|---|---|---|---|---|---|---|---|---|
| | J | K | A | B | C | D | E | F | G | H | I | L | S | | |
| 1 (2) | x | | x | | x | | | x | | | | x | | 10.593 | 1.300 |
| 2 (1) | x | | x | | | | | x | | x | | x | | 8.150 | |
| 2 (4) | x | | | x | | x | | x | | x | | x | | 8.150 | 1.300 |
| 3 (4) | x | | | x | | x | x | x | | x | | x | | 6.270 | 1.299 |
| 4 (3) | x | | | x | x | | x | | | x | | x | | 4.826 | |
| 4 (5) | x | | | x | x | | | | x | x | | x | | 4.826 | 1.301 |
| 5 (4) | x | | x | x | | x | | | x | x | | x | | 3.711 | |
| 5 (9) | x | | x | x | | x | | | x | | x | x | | 3.711 | |
| 5 (6) | x | | x | x | | x | | | x | | x | x | | 3.711 | 1.300 |
| 6 (7) | x | | | | x | | | x | | | x | | x | 2.856 | 1.300 |
| 7 (6) | x | | | x | | x | | x | | | x | | x | 2.197 | 1.299 |
| 7 (9) | x | | | x | | x | x | x | | | x | | x | 2.197 | |
| 8 (9) | x | | | x | | x | x | | | | x | | x | 1.689 | 1.301 |
| 9 (8) | x | | | x | x | | | | | | x | | x | 1.301 | |
| 9 (10) | x | | | x | x | | x | | x | | | | x | 1.301 | 1.301 |
| 10 (9) | x | | | x | | x | x | | x | | | | x | 1.000 | |
| 10 (11) | x | | | x | | | x | | x | | | | x | 1.000 | 1.299 |
| 11 (10) | x | | | x | x | | | x | | | | | x | 0.770 | 1.300 |
| 12 (10) | x | | | x | x | | | | x | | | | x | 0.592 | |

Fig. 6

DRIVE ARRANGEMENT FOR A HYBRID VEHICLE AND DRIVE TRAIN COMPRISING SUCH A DRIVE ARRANGEMENT

This application is a National Stage completion of PCT/EP2016/074446 filed Oct. 12, 2016, which claims priority from German patent application serial no. 10 2015 221 499.0 filed Nov. 3, 2015.

FIELD OF THE INVENTION

The invention relates to a drive arrangement for a hybrid vehicle. Furthermore, the invention relates to a drive train having such a drive arrangement.

BACKGROUND OF THE INVENTION

Hybrid vehicles with hybrid drives are known from the prior art.

Hybrid drives have two or more different drive sources; drive trains having an internal combustion engine and one or several electric machines as a parallel hybrid or mixed hybrid have become the standard. For these variants the flow of power of the internal combustion engine and the electric machine are arranged largely in parallel, permitting both a superposition of the drive torques and an actuation based solely on the internal combustion engine or in charge depletion mode.

Hybrid vehicles have a transmission in addition to the hybrid drive.

A transmission designates, in particular, a multi-speed transmission in which a plurality of gears, i.e. fixed gear ratios between two shafts of the transmission, can preferably be automatically shifted by shift elements. Such transmissions are primarily used in motor vehicles, in particular also in commercial vehicles, to adapt the rotational speed and torque output characteristics of the drive unit to the driving resistances of the vehicle in a suitable manner.

From DE 10 2010 063 582 A1 a drive arrangement for a hybrid vehicle, with a planetary gear set having the elements carrier, sun gear and ring gear is known, wherein a first element of these elements of the planetary gear set is used for the fixed connection of a first transmission input shaft of a first partial transmission of a transmission, and wherein a second element of these elements of the planetary gear set is used for the fixed connection of an electric machine of a hybrid drive.

The drive arrangement of DE 10 2010 063 582 A1 furthermore has a double shift element having two shift elements. If a first shift element of the double shift element is closed, a third element of the elements of the planetary gear set is connected to a second transmission input shaft of a second partial transmission of the transmission, to which an internal combustion engine of the hybrid drive may be coupled. If a second shift element of the double shift element is closed, the third element of the planetary gear set is connected to the housing side or stator side.

Furthermore, the drive arrangement of DE 10 2010 063 582 A1 has a third shift element, which can be used in the closed state to couple both transmission input shafts of both partial transmissions to each other and in the open state to separate both transmission input shafts of both partial transmissions from each other. This permits an electrodynamic start (called EDA operation) and electrodynamic shifting (called EDS operation). In addition, the electric machine can be used as a starter generator (called ISG operation).

SUMMARY OF THE INVENTION

On the basis of the prior art, the invention addresses the problem of providing a drive assembly for a hybrid vehicle, which permits purely electric driving mode and hybrid mode in a simple and cost-effective manner that uses little space at a high functionality and which permits traction support by the electric machine in hybrid mode in all gears of a transmission.

Furthermore, a drive train for a hybrid vehicle with such a drive arrangement shall be created, in particular with an automated powershift transmission, which combines the various advantages of existing transmissions and converts them such that a drive train with this transmission resulting in low construction cost and high efficiency is created, especially having a gear ratio coverage and range between gear ratios for trucks.

These problems are solved by a drive arrangement according to the independent claims.

The drive arrangement comprises at least one planetary gear set and four shift elements.

The planetary gear set has the elements carrier, sun gear and ring gear, wherein a first element of the planetary gear set can be rotationally engaged with a first transmission input shaft, and wherein a second element of the planetary gear set can be rotationally engaged with the electric machine, namely a rotor thereof.

If the first shift element is closed, a third element of the planetary gear set can be fixedly joined to the housing or rotationally engaged with the electric machine, namely the rotor thereof. If the second shift element is closed, the third element of the planetary gear set can be rotationally engaged with the internal combustion engine. If the third shift element is closed, the first transmission input shaft can be rotationally engaged with the internal combustion engine. If the fourth shift element is closed, a second transmission input shaft can be rotationally engaged with the internal combustion engine.

The third shift element and the fourth shift element are formed by a first double shift element, whose actuator extends through a cup-like section of a drive shaft of the internal combustion engine encompassing the first double shift element on the outside, wherein the cup-like section of the drive shaft of the internal combustion engine extends up to the second shift element.

The drive assembly according to the invention for a hybrid vehicle results in simple and cost-effective charge depletion mode and hybrid driving with a small design size at a high functionality. In hybrid drive mode, the electric machine can provide traction assistance in all gears of a transmission. EDA operation, EDS operation and ISG operation can be used. The drive arrangement as such is independent of the gear set of the transmission. Furthermore, it is possible to dispense with any kind of clutch for starting or shifting gears between the internal combustion engine and the transmission or between the internal combustion engine and the drive arrangement.

According to a development of the invention, the actuator of the first double shift element extends in the radial direction through a slit extending in the axial direction in the cup-like section of the drive shaft of the internal combustion engine such that the actuator is displaceable in the axial direction relative to the cup-like section of the drive shaft of the internal combustion engine and engages rotationally in the circumferential direction with the cup-like section of the drive shaft of the internal combustion engine. This development is particularly simple, inexpensive and uses little space.

Preferably, the first element of the planetary gear set is designed as a carrier, the second element of the planetary gear set as a sun gear and the third element of the planetary gear set as a ring gear. This permits a particularly advantageous use of all operating modes, in particular of the EDA operation, EDS operation and ISG operation.

Preferably, the first shift element and the second shift element are formed by a second double shift element. This development is particularly simple, inexpensive and uses little space.

According to a first alternative, the first shift element, the second shift element, the third shift element and the fourth shift element are each formed as unsynchronized shift elements. According to a second alternative, the first shift element and the second shift element are formed as synchronized shift elements each, whereas the third shift element and the fourth shift element are each formed as unsynchronized shift elements. In particular the first alternative is very simple, inexpensive and uses little space.

The drive train according to the invention is defined in the independent claims.

BRIEF DESCRIPTION OF THE DRAWINGS

Preferred developments are presented in the subclaims and the description below. Embodiments of the invention will be described with reference to the drawings, without being limited thereto. In the figures:

DETAILED DESCRIPTION OF THE PREFERRED EMBODIMENTS

Figure 1:
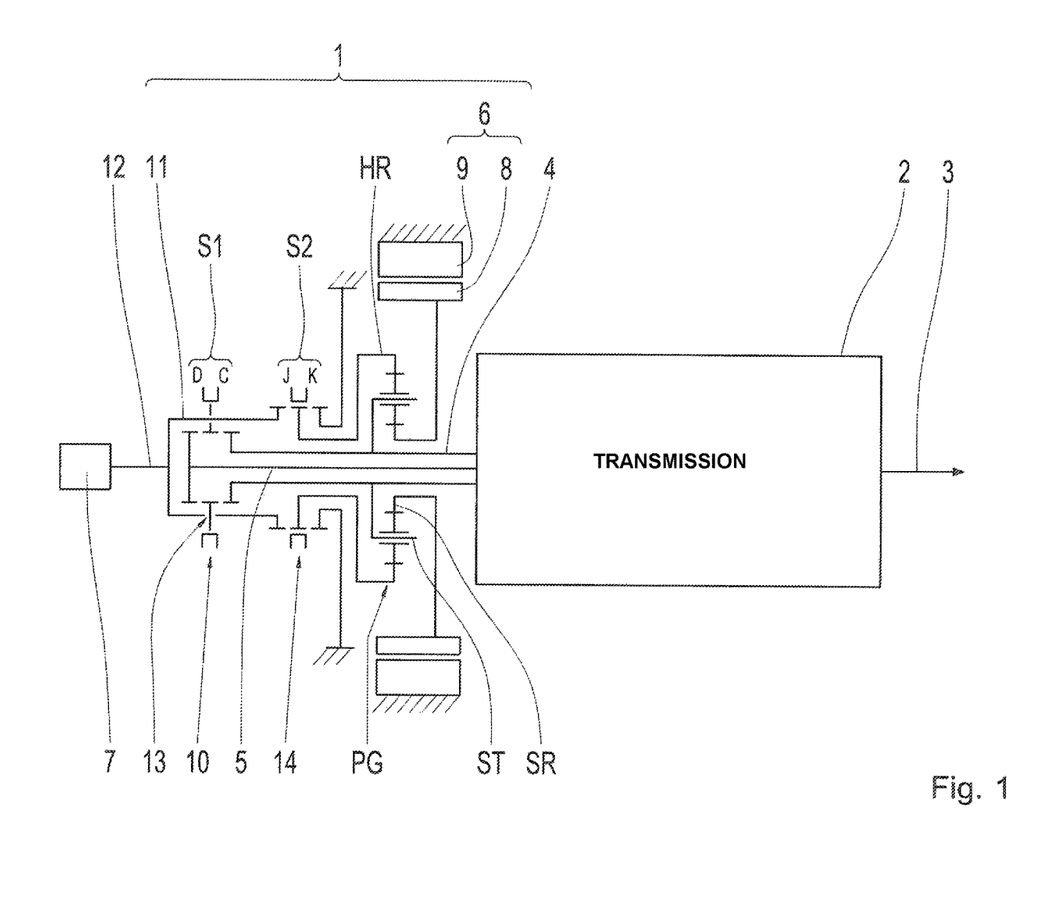
FIG. 1 shows a diagram of a first drive arrangement according to the invention.

The invention relates to a drive arrangement for a hybrid vehicle and to a drive train of a hybrid vehicle having such a drive arrangement. FIG. 1 shows a first preferred exemplary embodiment of a drive assembly 1 for a hybrid vehicle in conjunction with a transmission 2, which has two transmission input shafts 4, 5 and one output shaft 3, and in conjunction with an electric machine 6 and an internal combustion engine 7 of a hybrid drive of the hybrid vehicle. The drive assembly 1 according to the invention is connected between the two transmission input shafts 4, 5 of the transmission 2 and the drive unit, namely the electric machine 6 and the internal combustion engine 7, of the hybrid vehicle.

The drive assembly 1 according to the invention comprises a planetary gear set PG having the elements carrier ST, sun gear SR and ring gear HR.

A first element of the planetary gear set PG, preferably the carrier ST of the same, can be or is permanently and rotationally engaged with a first transmission input shaft 4 of the transmission 2.

A second element of the planetary gear set PG, preferably the sun gear SR thereof, can be or is permanently and rotationally engaged with the electric machine 6, namely to a rotor 8 of the electric machine 6. A stator 9 of the electric machine 6 is fixedly joined to the housing.

In addition to the planetary gear set PG, the drive assembly 1 comprises at least four shift elements, namely a first shift element K, a second shift element J, a third shift element C and a fourth shift element D. Preferably, as can be seen in FIG. 1, the third shift element C and the fourth shift element D are combined to form a first double shift element S1 and the first shift element K and the second shift element J are combined to form a further double shift element S2.

If the first shift element K is closed at the double shift element S2, a third element of the planetary gear set PG, in FIG. 1 the ring gear HR thereof, is fixedly joined to the housing. If, however, the second shift element J is closed in the region of the double shift element S2, the third element of the planetary gear set PG, namely the ring gear HR thereof, is rotationally engaged with the internal combustion engine 7, namely with a drive shaft 12 of the internal combustion engine 7.

If the third shift element C is closed in the region of the double shift element S1, the first transmission input shaft 4 is rotationally engaged with the internal combustion engine 7, namely with the drive shaft 12 thereof. On the other hand, if the fourth shift element D is closed in the region of the double shift element S1, the second transmission input shaft 5 is rotationally engaged in a torque-proof manner with the internal combustion engine 7, namely to the drive shaft 12 of the internal combustion engine 7.

The planetary gear set PG and the four shift elements D, C, J and K are combined to form a structural unit. To allow for a particularly compact design, which requires little space, an actuator 10 of the double shift element S1, which provides the third and fourth shift element C and D, extends through a cup-like section 11 of the drive shaft 12 of the internal combustion engine 7, said cup-like section 11 of drive shaft 12 of the internal combustion engine 7 encompassing the double shift element S1, i.e. the third and fourth shift element C and D, radially outwards and further extending into the region of the double shift element S2, namely up to the second shift element J.

Not only can a plurality of different modes be used with the drive assembly 1 according to the invention shown in FIG. 1, for instance EDA operation, EDS operation, IGS operation and a charge depletion mode and hybrid mode, the drive arrangement is also simple, cost-effective and uses up little space.

The drive assembly 1 as such is independent of a specific gear set of the transmission. The only prerequisite of the drive assembly 1 is that the transmission 2 has two transmission input shafts for partial transmissions connected in parallel and a joint output shaft 3.

It is possible to dispense with any kind of clutch for starting or shifting gears between the internal combustion engine 7 and the drive arrangement 1. The electric machine 6 can provide traction assistance in all gears.

In the exemplary embodiment of FIG. 1, all the shift elements D, C, J and K of the drive assembly 1 are designed as positive-fit, unsynchronized shift elements. This is particularly inexpensive and simple.

Figure 2:
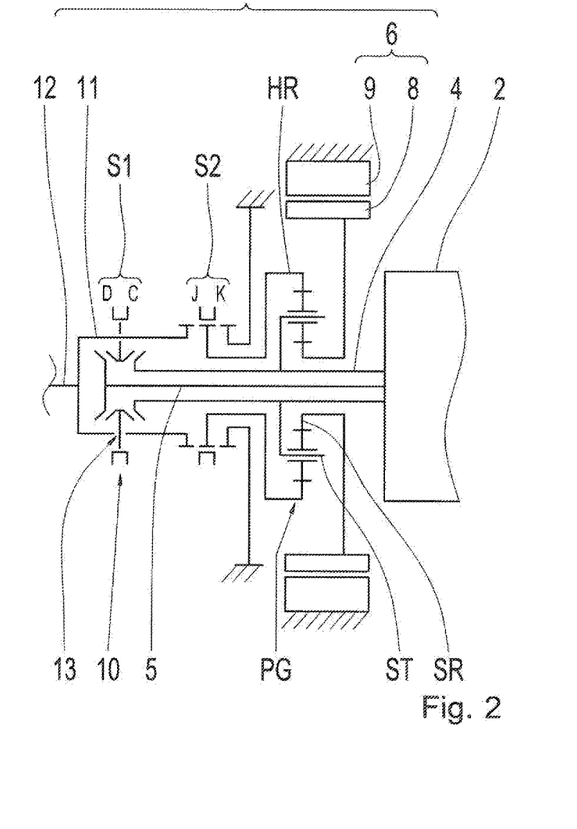
FIG. 2 shows a diagram of a second drive arrangement according to the invention.

In contrast, it is also possible, as shown in the variant of FIG. 2, to design the shift elements D and C of the double shift element S1, that is, the third shift element C and the fourth shift element D of the drive assembly 1, as synchronized, form-locking shift elements. With regard to all the other details, the drive arrangement of FIG. 2 coincides with the drive arrangement of FIG. 1; for that reason the same reference numerals are used to avoid unnecessary repetitions for the same modules and reference is made to the explanations of the exemplary embodiment of FIG. 1.

Figure 3:
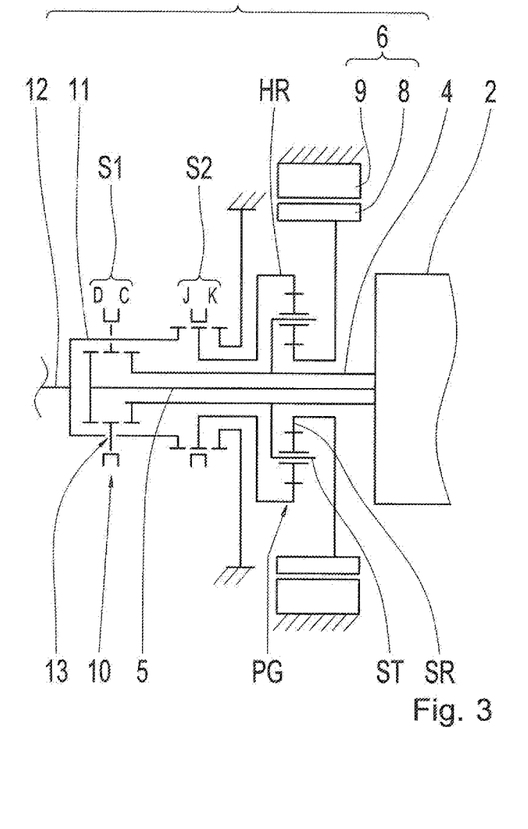
FIG. 3 shows a diagram of a third drive arrangement according to the invention.

FIG. 3 shows a further embodiment of a drive arrangement 1 according to the invention.

The drive arrangement 1 of FIG. 3 differs from the drive arrangement 1 of FIG. 1 only in that when the first shift element K is closed in the region of the double shift element S2, the third element of the planetary gear set PG, namely the ring gear HR, is not fixedly joined to the housing, but together with the second element, namely the sun gear SR of the planetary gear set PG, rotationally engaged with the electric machine 6, namely with the rotor 8 thereof.

While in the variants of FIGS. 1 and 2, the planetary gear set PG acts as a constant ratio for the electric machine 6 when the first shift element K is closed, the planetary gear set PG is blocked in the embodiment of FIG. 3 if the first shift element K of the double shift element S2 closed, thus providing a ratio of "1". This is advantageous when the electric machine 6 requires approximately the same speed as the internal combustion engine 7.

Another, alternative, not shown, for the drive assembly 1 according to the invention is that the first shift element K of the double shift element S2 can in the closed state connect the third element, namely the ring gear HR, of the planetary gear set PG to the first element, namely the carrier ST, of the planetary gear set PG, to achieve the locking.

In FIG. 3, the third and fourth shift elements D and C of the double shift element S1 can in turn be designed as synchronized, form-locking shift elements.

As already stated, preferably no clutch is inserted between the internal combustion engine 7 and the drive arrangement 1.

However, it is possible to provide such a clutch for starting or for shifting gears for the internal combustion engine 7.

As also already stated, the elements of the planetary gear set PG can interact in other ways with the transmission input shafts of the transmission 2 and the electric machine 6 and the shift elements. Thus, it is possible, for instance, for the electric machine 6 not to engage with the sun gear SR, but to rotatably engage with the ring gear HR, then the sun gear SR can be shifted via the first and second shift elements K and J of the double shift element S2 between the first transmission input shaft 4 and a housing-side connection or a connection to another element of the planetary gear set for locking purposes.

Furthermore, in the variants of FIGS. 1, 2 and 3 plus gear sets may be used to provide different ratios for the illustrated planetary gear set PG.

As stated above, the drive arrangement 1 according to the invention as such is independent of the gear set of the transmission 2. However, the drive arrangement 1 according to the invention is particularly preferably used with a transmission 2, which has the gear set shown in FIG. 4, wherein the transmission 2 shown in FIG. 4 comprises a main transmission HG having two partial transmissions connected in parallel and a range group GP downstream of the main transmission HG.

As already stated, a first element of the drive assembly 1, in FIG. 4 once again the carrier ST, engages rotationally with the first transmission input shaft 4, which is allocated to a first partial transmission. The second transmission input shaft 5 is allocated to the second partial transmission of the main transmission HG, the transmission 2 having a joint output shaft 3 for both partial transmissions. The electric machine 6, namely the rotor 8 thereof, is permanently connected to and rotationally engaged with a second element of the planetary gear set PG of the drive assembly 1, namely in FIG. 4 to the sun gear SR. The internal combustion engine 7 is either shiftably connected to the first transmission input shaft 4, if the third shift element C is closed, or rotationally engaged with the second transmission input shaft 7, if the fourth shift element D is closed.

Figure 4:
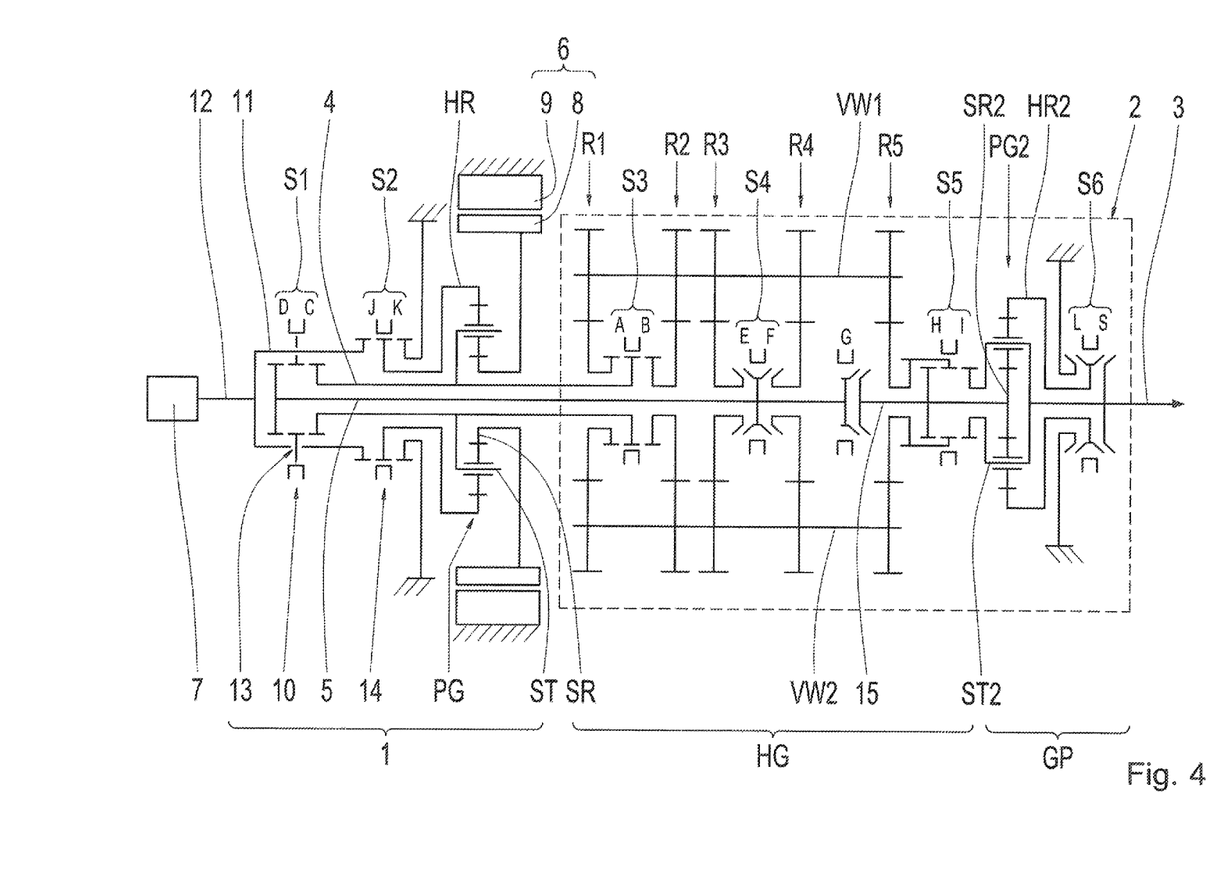
FIG. 4 shows the drive assembly of FIG. 1 in combination with a preferred transmission.

The main transmission HG has gear sets, namely a first gear set R1, a second gear set R2, a third gear set R3, a fourth gear set R4, and a fifth gear set R5, wherein the first gear set R1 and the second gear set R2 are allocated to the first partial transmission and the third gear set R3 and the fourth gear set R4 are allocated to the second partial transmission. The fifth gear set R5 provides a so-called output constant for the main transmission HG.

The main transmission HG has a first shift element A, a second shift element B, a third shift element E, a fourth shift element F, a fifth shift element G, a sixth shift element H and a seventh shift element I. The first shift element A and the second shift element B of the main transmission HG have been combined to form the double shift element S3. The third shift element E and the fourth shift element F of the main transmission HG have been combined to form the double shift element S4. The sixth shift element H and the seventh shift element I of the main transmission HG have been combined to form the double shift element S5. The fifth shift element G of the main transmission HG is provided by a single shift element. All of these shift elements are form-locking shift elements.

The range group GP downstream of the main transmission HG comprises a planetary gear set PG2 having the elements sun gear SR2, carrier ST 2 and ring gear HR2 and an eighth shift element L and a ninth shift element S, the eighth shift element L and the ninth shift element S being combined to form the double shift element S6.

The gear sets R1, R2, R3, R4 and R5 have idler gears, which are mounted either on the first transmission input shaft 4, on the second transmission input shaft 5 or on a main shaft 15 of the transmission 2. The idler gears of the gear planes R2, R3, R4 are mounted on the second transmission input shaft 5, whereas the idler gear of the first gear plane R1 is mounted on the first transmission input shaft 4 and the idler gear of the gear plane R5 on the main shaft 15. All idler gears mesh with fixed wheels, which are mounted on two countershafts VW1 and VW2.

If the fifth shift element G of the main transmission HG is closed, the second transmission input shaft 5 is directly rotationally engaged with the main shaft 15 of the transmission 2. If, however, the fifth shift element G of the main transmission HG is opened, this rotationally engaged connection between the second transmission input shaft 5 and the main shaft 15 of the transmission 2 is interrupted.

The output constant of the main transmission HG, which is provided by the fifth gear set R5 of the main transmission HG, can be shifted by means of the double shift element S5, which includes the shift elements H and I of the transmission 2, in such a way that when the sixth shift element H of the transmission 2 is closed in the region of the double shift element S5, the output constant and thus the fifth gear plane R5 of the main transmission HG is rotationally engaged with the main shaft 15, which is rotationally engaged with a first element, namely the sun gear SR2, of the planetary gear set PG2 of the range group GP. If, however, the seventh shift element I of the transmission 2 is closed in the region of the double shift element S5, the output constant or the fifth gear plane R5 of the main transmission HG is rotationally engaged with the output shaft 3 of the transmission 2, to which also a second element of the planetary gear set PG2, namely, the carrier ST2 thereof, of the range group GP is rotationally engaged.

A third element of the planetary gear set PG2 the range group GP, namely the ring gear HR2 thereof, can be shifted depending on the shifting position of the shift elements L and S of the double shift element S6 of the transmission 2, in such a way that if the eighth shift element L of the transmission 2 is closed in the region of the double shift element S6, the ring gear HR2 of the planetary gear set PG2 of the range group GP is fixedly joined to the housing, whereas if the ninth shift element S of the transmission 2 is closed in the region of the double shift element S6, the ring gear HR2 of the planetary gear set PG2 of the range group GP is rotationally engaged with the output shaft 3 of the transmission 2, together with the carrier ST2 of the planetary gear set PG2 of the range group GP.

In the variant of the embodiment of FIG. 4, the shift elements K, J, C and D of the drive assembly 1 are unsynchronized, form-locking shift elements. Likewise, the shift elements A, B, H and I of the main transmission HG of the transmission 2 are unsynchronized, form-locking shift elements. The shift elements E, F and G of the main transmission HG of the transmission 2, however, are synchronized, form-locking shift elements, just like the shift elements L and S of the transmission 2 are synchronized, form-locking shift elements. If, as shown in the variant of FIG. 2, the shift elements C and D of the double shift element S1 of the drive assembly 1 are designed as synchronized form-locking shift elements, in the region of the main transmission HG provision is preferably made that the third shift element E, the fourth shift element F and the fifth shift element G of the transmission 2 are designed as unsynchronized shift elements.

In the embodiment of FIG. 4, the electric machine 6 can be used to actively synchronize the shift elements A, B, H, I, J and K if and when the electric machine 6 is operated in a speed-controlled manner. The internal combustion engine 7 in the variant of FIG. 4 can be used to actively synchronize the shift elements C and D, via a variable speed operated internal combustion engine 7, alternatively jointly by the electric machine 6 and the internal combustion engine 7 by speed superposition of the planetary gear set PG of the drive assembly 1. As stated above, the shift elements E, F, G, L and S of the transmission 2 in the variant of FIG. 4 are synchronized shift elements.

If, as shown in FIG. 2, the shift elements D and C of the drive assembly 1 are designed as synchronized shift elements, the shift elements E, F and G of the transmission 2 are designed as unsynchronized shift elements, which can be actively synchronized, via the internal combustion engine 2 in variable-speed operation or at speed superposition of the internal combustion engine 7 and the electric machine 6 on the planetary gear set PG of the drive assembly 1. The shift elements A, B, H, I, J and K are again, as described in FIG. 4 above, synchronized by means of a speed-controlled electric machine 6.

If the first shift element K in the drive assembly 1 according to the invention is closed, a so-called ISG operating mode is used, wherein the planetary gear set PG in FIG. 4 serves as a fixed intermediate gear for the electric machine 6. If, however, the second shift element J of the drive assembly 1 is closed, the so-called EDA operating mode, in which the planetary gear set PG of the drive assembly 1 acts as a superposition gear, is active.

The main transmission HG has, as already stated, two partial transmissions in parallel, and an output constant, the output constant being provided by the fifth gear plane R5. The first partial transmission having the first transmission input shaft 4 is allocated to the electric machine 6. The second partial transmission having the second transmission input shaft 5 is allocated to the internal combustion engine 7. The internal combustion engine 7 can be coupled to the first transmission input shaft 4 and thus also to the electric machine 6 via the third shift element C of the drive arrangement, without a gear being shifted to the output shaft 3. As a result, the internal combustion engine 7 can be started via the electric machine 3, alternatively it is possible to generate electricity in neutral, that is to say independently of a driving speed and at a standstill, in which case the internal combustion engine 7 drives the electric machine 6 in generator mode.

The gears associated with the first transmission input shaft 4, i.e. the gears of the gear planes R1 and R2, can be used in purely electric driving mode. The range group GP downstream of the main transmission HG, which serves to double the number of gears of the main transmission HG, can provide four electrical gears. If the eighth shift element L of the transmission 2 is closed in the region of the range group GP, a slow drive range of the range group GP is selected. If, however, the ninth shift element S of the transmission 2 is closed in the range group GP, a fast driving range of the range group GP is selected. Such a range group GP is particularly advantageous for use in trucks.

As stated above, a clutch between the internal combustion engine 7 and drive assembly 1 can be dispensed with, as the drive shaft 12 can be decoupled by open shift elements C and D.

The two partial transmissions of the main transmission HG operated in parallel can be used to operate the internal combustion engine 7 and the electric machine 6 at different ratios. Thus, depending on the driving situation, suitable operating points can be selected for the internal combustion engine 7 and the electric machine 6, respectively. To avoid zero load losses, the electric machine 6 can also be completely decoupled and brought to a standstill.

In hybrid mode, power shifting is possible. If a gear change is to be performed, which is allocated to the first transmission input shaft 4 allocated to the first partial transmission, the internal combustion engine 7 supports the traction force via the second transmission input shaft 5. If, however, a gear change is to be performed for a gear which is allocated to the second partial transmission, which interacts with the second transmission input shaft 5, the electric machine 6 and the first transmission input shaft 4 can support the traction force.

As explained above, the output constant of the main transmission HG provided by the fifth gear plane R5 can be coupled or shifted by the shift elements H and I of the transmission 2 combined to form the double shift element S5. Advantageously, with the seventh shift element I being closed, the output constant or fifth gear plane R5 is coupled to the carrier ST2 of the planetary gear set PG2 of the range group GP, as then the electric machine 6 can support the traction force via the countershafts VW1 and VW2, while the shift elements L and S of the range group GP can be power shifted. If the fifth shift element G of the transmission 2 is closed, a direct gear can be used; the flow of power does then not pass through the countershafts VW1 and VW2. When driving in direct gear, the speeds of the countershafts VW1 and VW2 can be lowered, reducing drag losses on bearings and seals.

Figure 5:
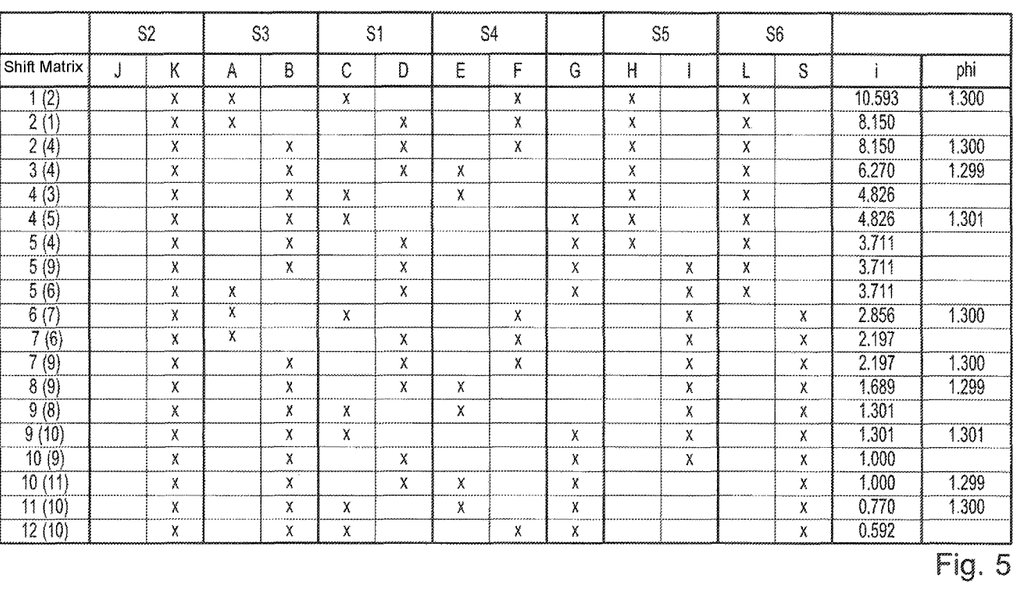
FIG. 5 shows a first shifting matrix for the drive arrangement and the transmission of FIG. 4.

As already above, the so-called ISG operating mode is preselected if the shift element K of the drive arrangement is closed. FIG. 5 shows a shifting matrix for the drive train of FIG. 4 in the so-called ISG operating mode with a closed shift element K, and from the point of view of the internal combustion engine 2. In FIG. 5 an X was used to mark those shift elements for every gear, which are closed in the respective gears. i denotes exemplary ratios of the gears, phi denotes gear transitions.

These numerical values are based on the assumption that a stationary gear ratio i0=−2.0 is selected for the planetary gear set PG of the drive assembly 1 and a stationary gear ratio i0=−2.713 for the planetary gear set PG 2 of the range group PG. Furthermore, these numerical values are based on the assumption that the gear plane R1 has a ratio of −1.3, the gear plane R3 has a ratio of −0.592, the gear plane R3 has a ratio of −0.769, the gear plane R4 has a ratio of −1.0 and the gear plane R5 has a ratio of −2.197. These exemplary ratios are purely exemplary in nature and of course different selections can be made.

The ratios of the spur gear pairs of the gear planes R1, R2, R3, R4 and R5 are specified such that for the gear planes R1, R2, R3 and R4, a direction of the flow of power acts from the drive shafts towards the countershafts, wherein for the gear plane R5, a direction of the flow of power acts from the countershafts towards the main shaft.

As stated above, the shifting matrix of FIG. 5 indicates the gears, gear ratios and gear transitions from the point of view of the internal combustion engine 7, a total of twelve gears being provided from the point of view of the internal combustion engine. In each of the 12 gears, at least one gear preselection can be made, the preselected gear being indicated in parentheses. For instance, FIG. 5 shows that the first gear and the fourth gear may be preselected for gear 2, which are then active for electric machine 6.

Gear 10 of the shifting matrix of FIG. 5 is a direct gear with a ratio i of 1.0.

The gears 11 and 12 of the shifting matrix of FIG. 5 are so-called overdrive gears, it is not possible to power shift from the overdrive gear 11 to the overdrive gear 12. It is, however, possible to power shift from the direct gear 10 into the overdrive gear 11, and from the direct gear 10 into the overdrive gear 12.

In the overdrive gear 11 of the shift matrix of FIG. 5, partial transmissions of the main transmission HG are coupled, the flow of power flows via the gear planes R2 and R3 and via the shift element G to the range group GP. In the overdrive gear 12, the power flow is conducted to the range group GP via the gear planes R2 and R4 and via the shift element G.

In gears 6, 7, 8 and 9 of the shifting matrix of FIG. 5, the shift element L instead of the shift element S of the double shift element S6 may remain closed, because these two shift elements L and S are in a load-free state when the flow of power is guided through the shift element I directly onto the carrier ST2 of the planetary gear set PG2 of the area group GP. Due to the speed ratios effective at the range group GP, however, it is advantageous to execute a change from the shift element L to the shift element S as early as possible.

As also stated above, the so-called EDA operating mode is active if the second shift element J is closed in the region of the double shift element S2 of the drive arrangement 1.

Figure 6:
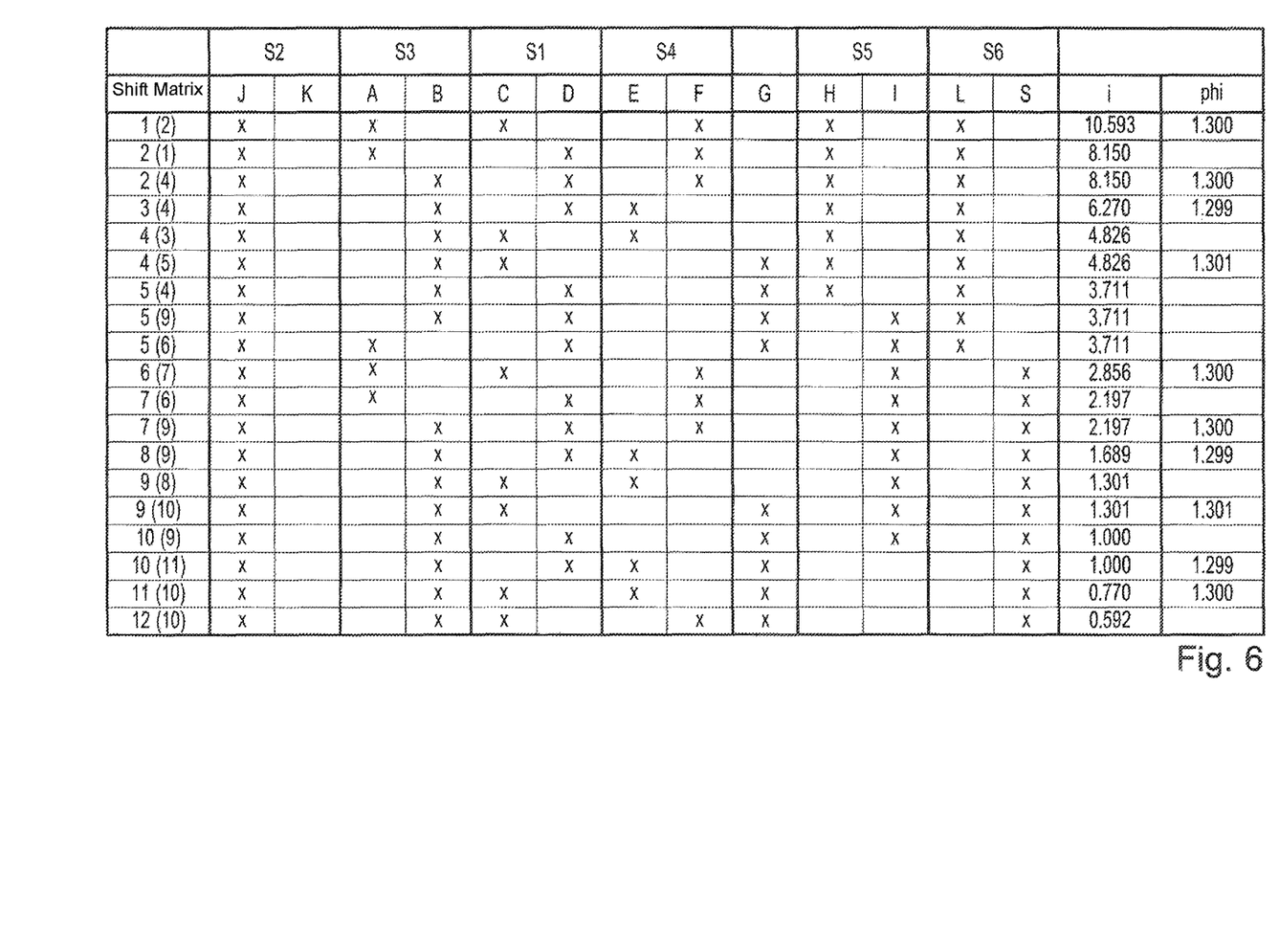
FIG. 6 shows a second shifting matrix for the drive arrangement and the transmission of FIG. 4.

FIG. 6 again shows, from the point of view of the internal combustion engine, a shifting matrix for the EDA operating mode, which, except for the shifting position of the shift elements J and K, is identical to the shifting matrix of FIG. 5 for the ISG operating mode. However, the speed ratios resulting on the electric machine 6 and on the planetary gear set PG of the drive arrangement 1 are different.

If the EDA operating mode is active with closed second shift element J of the drive assembly 1, the first shift element A of the main transmission HG is closed to enable driving off in first gear. Furthermore, the shift elements H and L of the transmission 2 are closed. When stationary, the carrier ST of the planetary gear set PG is stationary. The internal combustion engine 7 rotates at idling speed, the electric machine 6 rotates in reverse. The torque ratios on the planetary gear set PG are constant. The torques provided by the internal combustion engine 7 and by the electric machine 6 are added at the carrier ST of the planetary gear set PG. In this way, it is possible to drive off in EDA operating mode. During this driving off, the rotational speed of the electric machine 6 changes to the direct gear at the planetary gear set PG. The driving-off process can be terminated by closing the shift element C, in which case the planetary gear set PG is locked.

Furthermore, for a closed shift element J in EDA operating mode, a so-called EDS operating mode can be used, namely a power shifting function, which is referred to as electrodynamic shifting. For this purpose, a gear allocated to the first partial transmission has to be engaged. It serves as a support gear, through which the flow of power is guided during power shifting. This support gear may be identical to the actual gear or the target gear of the transmission, but does not have to correspond to the same.

To execute shifting in EDS operating mode, first a load transfer occurs, for which purpose the torques are set on the internal combustion engine 7 and on the electric machine 6 such that a flow of force is guided exclusively via the carrier ST of the planetary gear set PG and the support gear, resulting in all other gearshift elements becoming load-free. The shift element of the actual gear that has become load-free can then be disengaged. The speeds of the internal combustion engine 7 and the electric machine 6 are then controlled such that the shift element of the target gear to be engaged is synchronized, then the synchronized shift element of the target gear can be engaged. Shifting is completed, the load on the electric machine 6 can be applied if necessary.

EDS shifting has the advantage that the shift element to be closed is synchronized in the interaction of the electric machine 6 and the internal combustion engine 7, the electric machine 6 being easy to control. Another advantage of EDS shifting is that a high traction force can be achieved because the torques of the internal combustion engine 7 and the electric machine 6 are added up at the planetary gear set PG of the drive assembly 1.

REFERENCE NUMERALS 1 drive assembly
2 transmission
3 output shaft
4 transmission input shaft
5 transmission input shaft
6 electric machine
7 internal combustion engine
8 rotor
9 stator
10 actuator
11 cup-like section
12 drive shaft
13 slit
14 actuator 15 main shaft
A shift element of the transmission
B shift element of the transmission
C shift element of the drive assembly
D shift element of the drive assembly
E shift element of the transmission
F shift element of the transmission
G shift element of the transmission
H shift element of the transmission
I shift element of the transmission
J shift element of the drive assembly
K shift element of the drive assembly
L shift element of the transmission
S shift element of the transmission
HG main transmission
GP range group
PG planetary gear set
SR sun gear
ST carrier
HR ring gear
PG2 planetary gear set
SR2 sun gear
ST2 carrier
HR2 ring gear
VW1 countershaft
VW2 countershaft
R1 gear plane
R2 gear plane
R3 gear plane
R4 gear plane
R5 gear plane
S1 double shift element
S2 double shift element
S3 double shift element
S4 double shift element
S5 double shift element
S6 triple shift element

The invention claimed is:

1. A drive arrangement for a hybrid vehicle, the hybrid vehicle having a hybrid drive having an internal combustion engine and an electric machine and a transmission having first and second transmission input shafts and an output shaft, the drive arrangement comprising at least:
a planetary gear set having a planet carrier, a sun gear and a ring gear, a first element of the planetary gear set is rotationally engagable with the first transmission input shaft, and a second element of the planetary gear set is rotationally engagable to a rotor of the electric machine;
a first shift element being engagable either to fixedly join a third element of the planetary gear set to a housing or to rotationally engage the third element of the planetary gear set with the electric machine;
a second shift element being engagable to rotationally engage the third element of the planetary gear set with the internal combustion engine;
a third shift element being engagable to rotationally engage the first transmission input shaft (4) with the internal combustion engine;
a fourth shift element being engagable to rotationally engage the second transmission input shaft with the internal combustion engine;
the third shift element and the fourth shift element being formed as a first double shift element, and the first double shift element having an actuator extending through a cup-shaped section of a drive shaft of the internal combustion engine encompassing the first double shift element on an outside; and
the cup-shaped section of the drive shaft of the internal combustion engine extending up to the second shift element.

2. The drive arrangement according to claim 1, wherein the first element of the planetary gear set is the planet carrier, the second element of the planetary gear set is the sun gear and the third element of the planetary gear set is the ring gear.

3. The drive arrangement according to claim 1, wherein the actuator of the first double shift element extends, in a radial direction, through a slit in the cup-shaped section of the drive shaft (12) of the internal combustion engine such that the actuator is displaceable, in the axial direction, relative to the cup-shaped section of the drive shaft of the internal combustion engine and engages rotationally in a circumferential direction with the cup-shaped section of the drive shaft of the internal combustion engine.

4. The drive arrangement according to claim 1, wherein the first shift element and the second shift element are formed as a second double shift element.

5. The drive arrangement according to claim 1, wherein the first shift element, the second shift dement, the third shift element and the fourth shift element are each formed as unsynchronized shift elements.

6. The drive arrangement according to claim 1, wherein the first shift element and the second shift element are each formed as synchronized shift elements, and the third shift element and the fourth shift element are each formed as unsynchronized shift elements.

7. A drive train for a hybrid vehicle, having a hybrid output with an internal combustion engine and an electric machine, having a transmission with first and second transmission input shafts and an output shaft, and having a drive arrangement comprising at least:
a first planetary gear set having a planet carrier, a sun gear and a ring gear, a first element of the first planetary gear set is rotationally engagable with the first transmission input shaft, and a second element of the first planetary gear set is rotationally engagable to a rotor of the electric machine;
a first shift element being engagable either to fixedly join a third element of the first planetary gear set to a housing or to rotationally engage the third element of the first planetary gear set with the electric machine;
a second shift element being engagable to rotationally engage the third element of the first planetary gear set with the internal combustion engine;
a third shift element being engagable to rotationally engage the first transmission input shaft with the internal combustion engine;
a fourth shift element being engagable to rotationally engage the second transmission input shaft with the internal combustion engine;
the third shift element and the fourth shift element being formed as a first double shift dement, and the first double shift element having an actuator extending through a cup-shaped section of a drive shaft of the internal combustion engine encompassing the first double shift element on an outside; and
the cup-shaped section of the drive shaft of the internal combustion engine extending to the second shift element.

8. The drive train according to claim 7, wherein the electric machine is permanently coupled to the second element of the first planetary gear set.

9. The drive train according to claim 7, wherein the transmission comprises a main transmission having two partial transmissions in parallel with the first and the second transmission input shafts and the output shaft,
the main transmission comprises a first gear plane, a second gear plane, a third gear plane, a fourth gear plane and a fifth gear plane (R5),
the main transmission comprises a fifth shift element, a sixth shift element, a seventh shift element, an eighth shift element (F), a ninth shift element, a tenth shift element and an eleventh shift element,
the transmission comprises a range group having a planetary gear, a twelfth shift element and a thirteenth element, and the planetary gear set of the range group is connected to the main transmission such that, if the tenth shift element is engaged, the fifth gear plane of the main transmission and a first element of the planetary gear set of the range group are rotationally engaged with one another, and if the eleventh shift element is engaged, the fifth gear plane of the main transmission and a second element of the planetary gear set of the range group are rotationally engaged with one another.

10. The drive train according to claim 9, wherein the first element of the planetary gear set of the range group is rotationally engaged with a main shaft of the transmission, which is decoupled from the second transmission input shaft when the ninth shift element is disengaged, and which is rotationally engaged with the second transmission input shaft when the ninth shift element is engaged,
the second element of the planetary gear set of the range group is rotationally engaged with the output shaft,
a third element of the planetary gear set of the range group is fixedly joined to the housing when the twelfth shift element is engaged, and is rotationally engaged with the output shaft when the thirteenth shift element is engaged.

11. The drive train according to claim 9 wherein if the first shift element and the second shift element of the drive assembly are each formed as synchronized shift elements, then the seventh shift element, the eighth shift element and the ninth shift element of the main transmission are each designed as unsynchronized shift elements.

12. The drive train according to claim 9, wherein if the first shift element and the second shift element of the drive assembly are each formed as unsynchronized shift elements, then the seventh shift element, the eighth shift element and the ninth shift element of the main transmission are each designed as synchronized shift elements.

13. A drive arrangement for a hybrid vehicle, the drive arrangement comprising:
a hybrid drive having an internal combustion engine and an electric machine;
a transmission having first and second transmission input shafts and an output shaft that define a rotational axis;
a planetary gear set having first, second and third elements, the first element being one of a carrier, a sun gear and a ring gear, the second element being another one of the carrier, the sun gear and the ring gear, the third element being a further one of the carrier, the sun gear and the ring gear, the first element of the planetary gear set being permanently affixed to the first transmission input shaft to rotate in unison therewith, and the second element of the planetary gear set being permanently affixed to a rotor of the electric machine to rotate in unison therewith;
either:
a first shift element being engagable to rotationally fix the third element of the planetary gear set to a housing; or
a second shift element being engagable to rotationally fix the third element of the planetary gear set to a drive shaft of the internal combustion engine;
the drive shaft having a cup shaped end;
a third shift element being engagable to rotationally fix the first transmission input shaft to the drive shaft of the internal combustion engine;
a fourth shift element being engagable to rotationally fix the second transmission input shaft to the drive shaft of the internal combustion engine;
the third shift element and the fourth shift element being formed as a first double shift element, the first double shift element having an actuator that extends radially inward through the cup shaped end of the drive shaft, and the cup shaped end of the drive shaft encircling the first double shift element; and
the cup shaped end of the drive shaft extending axially to the second shift element.

* * * * *